(12) United States Patent
Guemmer

(10) Patent No.: US 9,638,040 B2
(45) Date of Patent: May 2, 2017

(54) BLADE OF A ROW OF ROTOR BLADES OR STATOR BLADES FOR USE IN A TURBOMACHINE

(71) Applicant: Rolls-Royce Deutschland Ltd & Co KG, Blankenfelde-Mahlow (DE)

(72) Inventor: Volker Guemmer, Mahlow (DE)

(73) Assignee: ROLLS-ROYCE DEUTSCHLAND LTD & CO KG, Blankenfel de-Mahlow (DE)

( * ) Notice: Subject to any disclaimer, the term of this patent is extended or adjusted under 35 U.S.C. 154(b) by 547 days.

(21) Appl. No.: 14/348,845

(22) PCT Filed: Sep. 28, 2012

(86) PCT No.: PCT/EP2012/069214
§ 371 (c)(1),
(2) Date: Mar. 31, 2014

(87) PCT Pub. No.: WO2013/045629
PCT Pub. Date: Apr. 4, 2013

(65) Prior Publication Data
US 2014/0248154 A1    Sep. 4, 2014

(30) Foreign Application Priority Data
Sep. 29, 2011    (DE) .................. 10 2011 083 778

(51) Int. Cl.
*F01D 5/14*    (2006.01)
*F04D 29/32*    (2006.01)
(Continued)

(52) U.S. Cl.
CPC ............ *F01D 5/14* (2013.01); *F01D 5/141* (2013.01); *F01D 5/145* (2013.01); *F04D 29/324* (2013.01);
(Continued)

(58) Field of Classification Search
CPC ............ F01D 5/14; F01D 5/145; B29C 39/02
See application file for complete search history.

(56) References Cited

U.S. PATENT DOCUMENTS

| 4,822,249 A | 4/1989 | Eckardt et al. |
| 2004/0241003 A1* | 12/2004 | Roy .................. F01D 5/141 |
| | | 416/236 R |

(Continued)

FOREIGN PATENT DOCUMENTS

| CH | EP 1371813 A1 * 12/2003 ............. F01D 5/145 |
| DE | 3325663    1/1985 |

(Continued)

OTHER PUBLICATIONS

English Translation EP 1371813 A1.*
(Continued)

*Primary Examiner* — Mark Laurenzi
*Assistant Examiner* — Shafiq Mian
(74) *Attorney, Agent, or Firm* — Shuttleworth & Ingersoll, PLC; Timothy J. Klima

(57) ABSTRACT

The present invention relates to a blade of a row of rotor blades or stator blades for use in a turbomachine, with the blade being designed with a substantially convex suction side and a substantially concave pressure side as well as with a leading edge, onto which the flow passes, and a trailing edge, away from which the flow passes. The blade has at least one contour recess provided on at least one of the blade sides including the suction side and the pressure side, wherein the contour recess includes a step edge, a contour corner and a flank face provided between the step edge and the contour corner. The contour recess extends over at least a part of the profile depth and/or the profile height of the blade.

28 Claims, 12 Drawing Sheets

(51) Int. Cl.
*F04D 29/68* (2006.01)
*F04D 29/54* (2006.01)
(52) U.S. Cl.
CPC ......... *F04D 29/544* (2013.01); *F04D 29/681* (2013.01); *F05D 2270/17* (2013.01); *Y02T 50/673* (2013.01)

(56) References Cited

U.S. PATENT DOCUMENTS

| | | | |
|---|---|---|---|
| 2008/0219852 A1* | 9/2008 | Guemmer | F01D 5/145 416/235 |
| 2008/0298974 A1 | 12/2008 | Guemmer | |
| 2009/0136354 A1 | 5/2009 | Takahashi et al. | |
| 2010/0008785 A1* | 1/2010 | Tardif | F01D 5/147 416/223 R |

FOREIGN PATENT DOCUMENTS

| | | |
|---|---|---|
| DE | 102007024840 | 12/2008 |
| EP | 1371813 | 12/2003 |

OTHER PUBLICATIONS

Translation of International Search Report and Written Opinion from counterpart App No. PCT/EP2012/069214.
International Search Report and Written Opinion dated Feb. 8, 2013 from counterpart App No. PCT/EP2012/069214.
German Search Report dated Jun. 28, 2012 from counterpart German Patent App No. 10 2011 083 778.7.

* cited by examiner

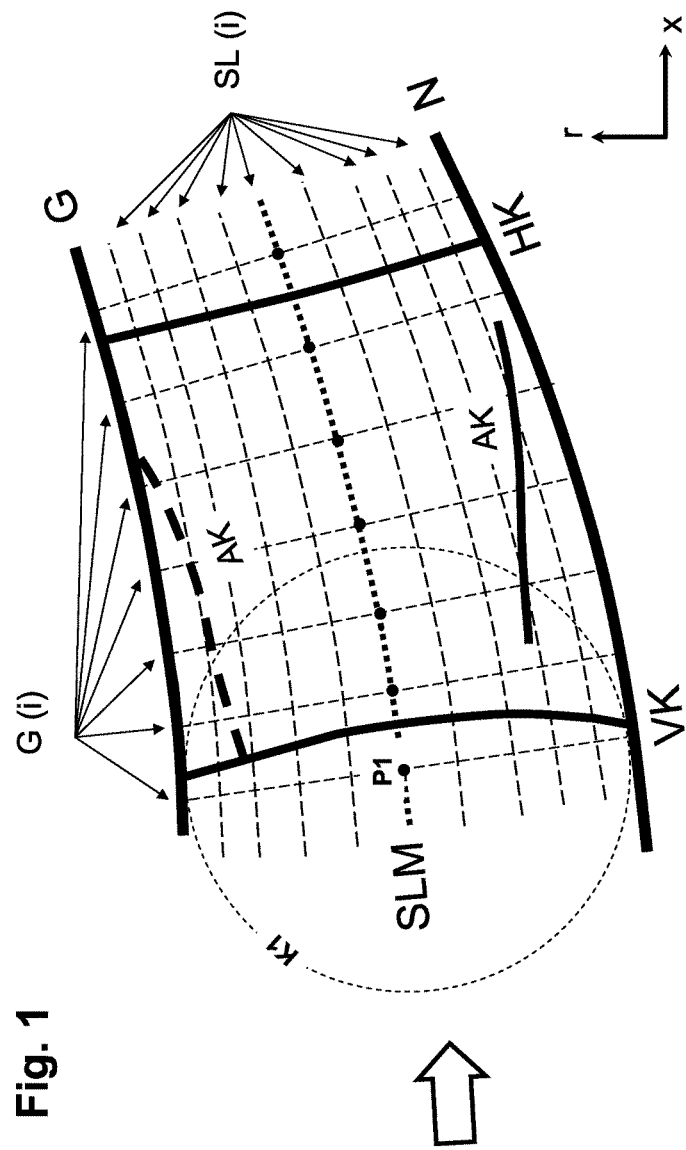

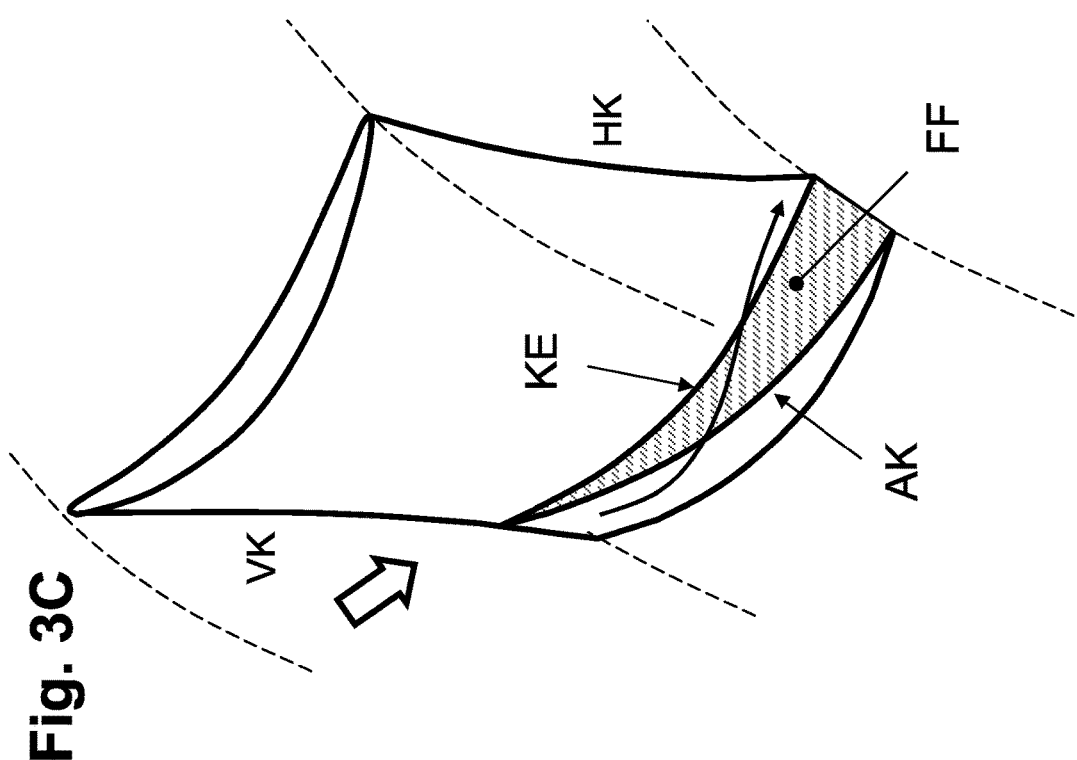
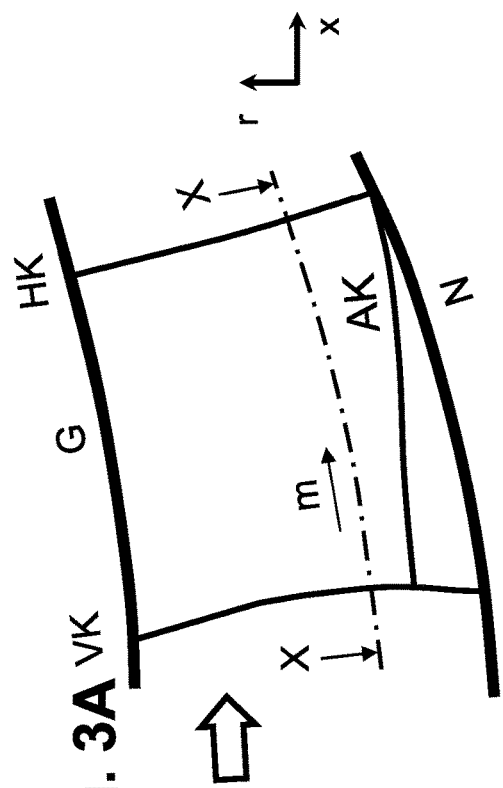
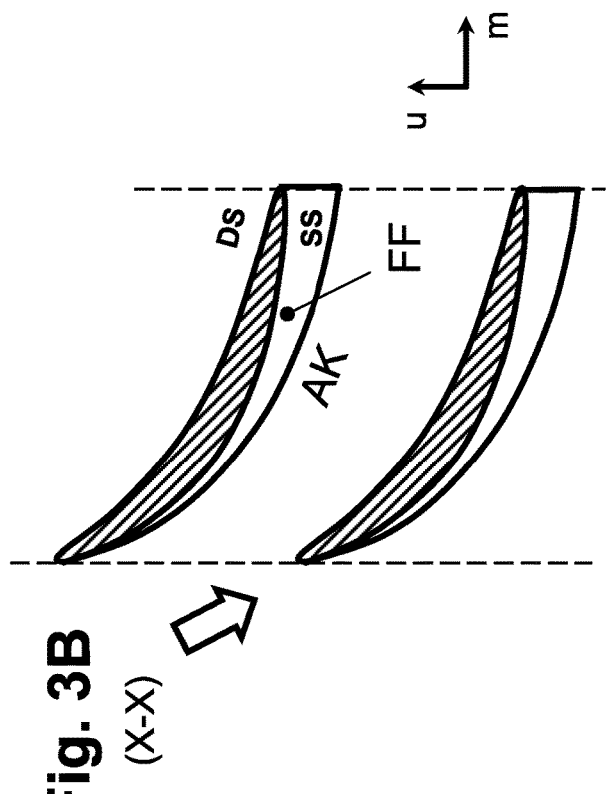

(X-X)

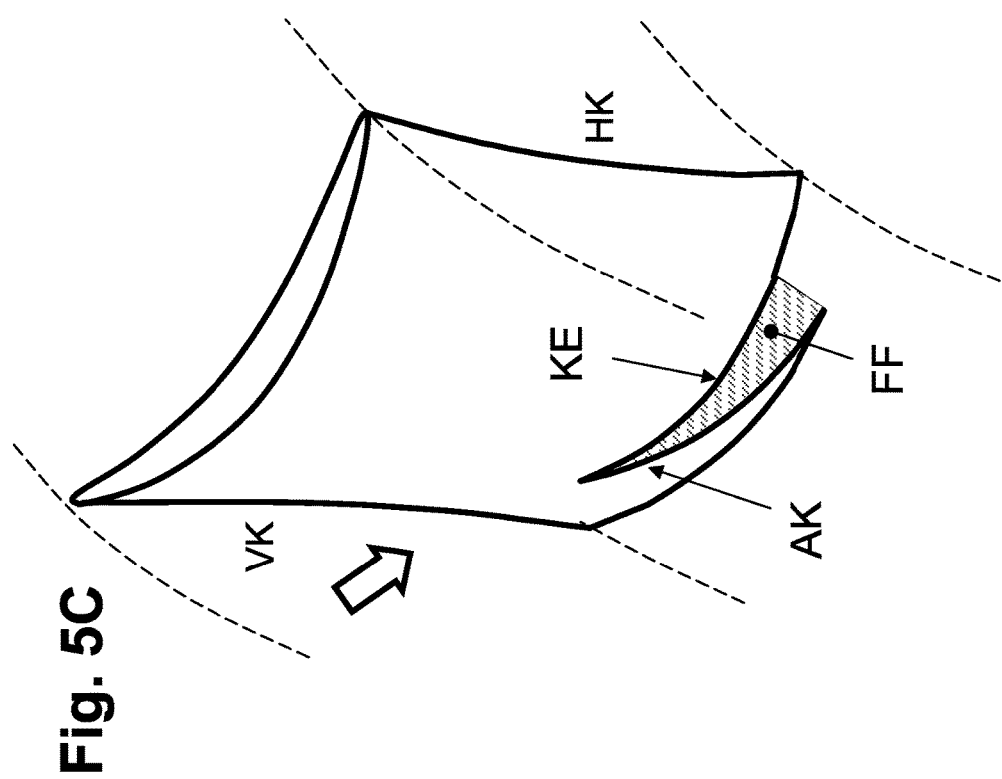
Fig. 5C
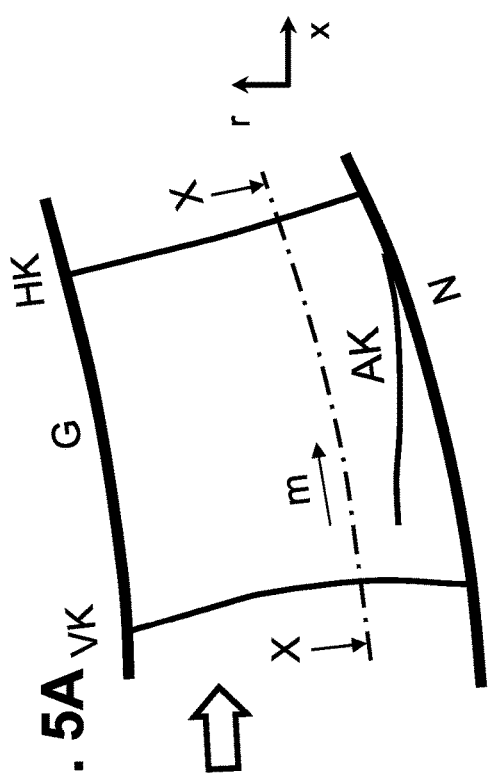
Fig. 5A (VK)
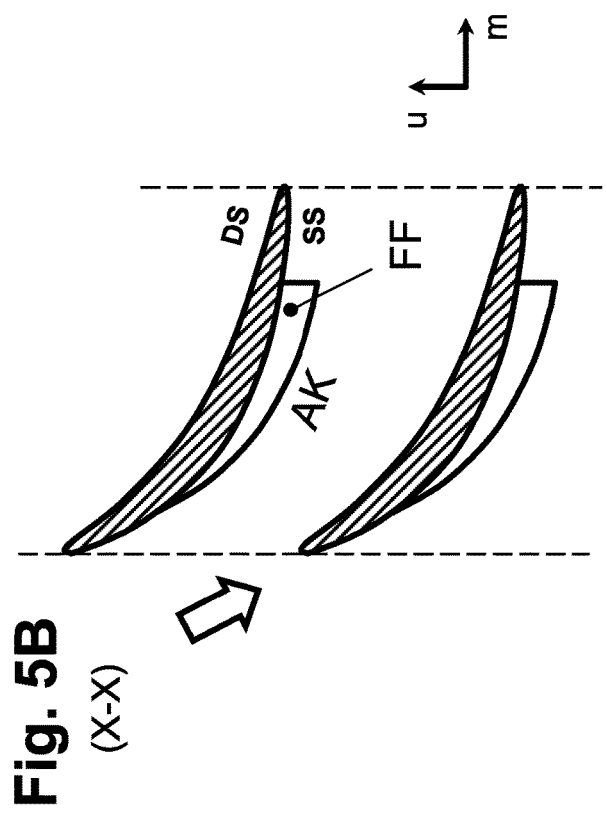
Fig. 5B (X-X)

(X-X)

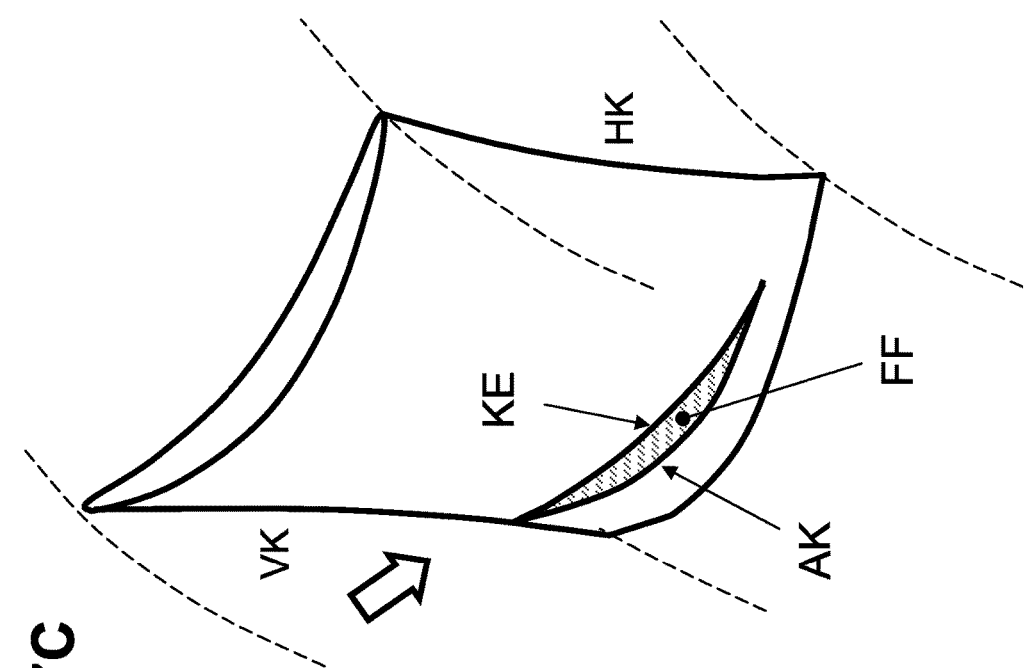
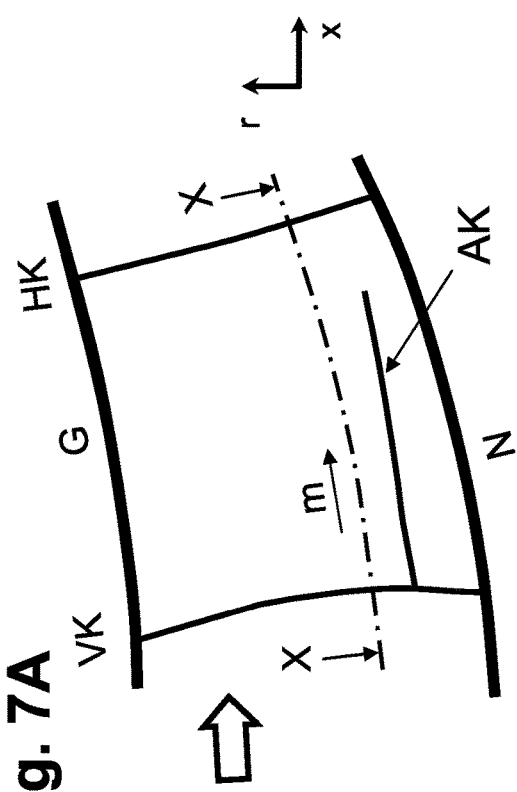
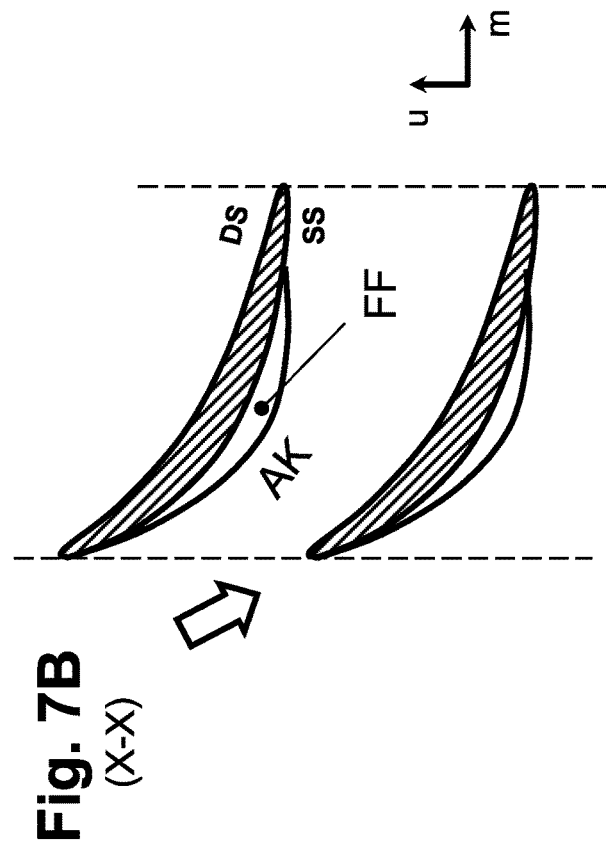

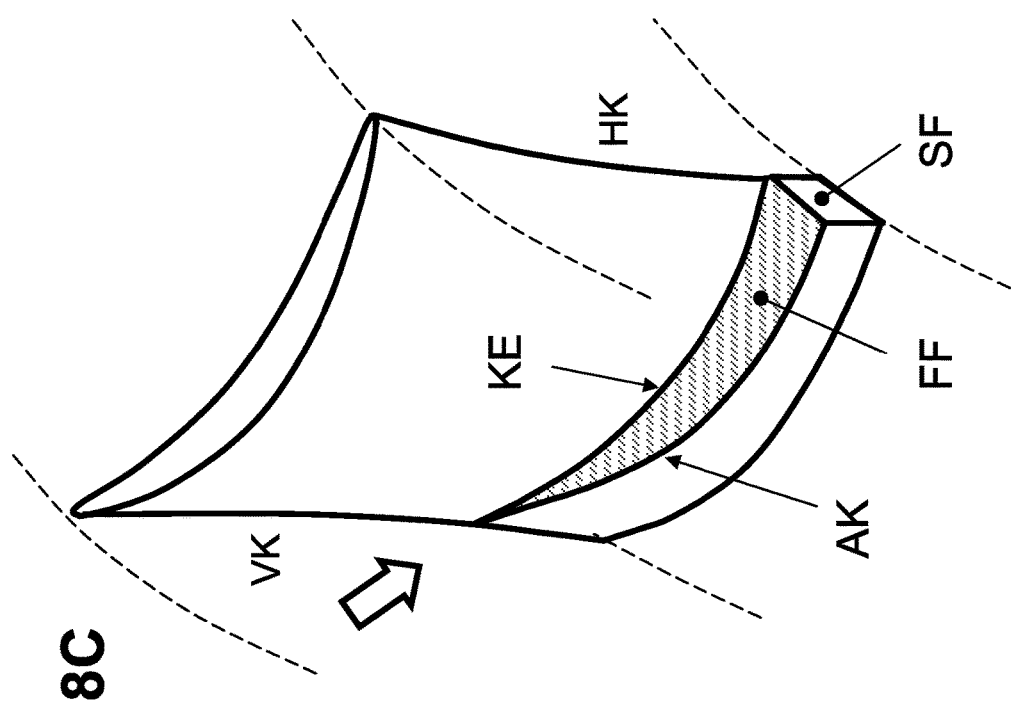
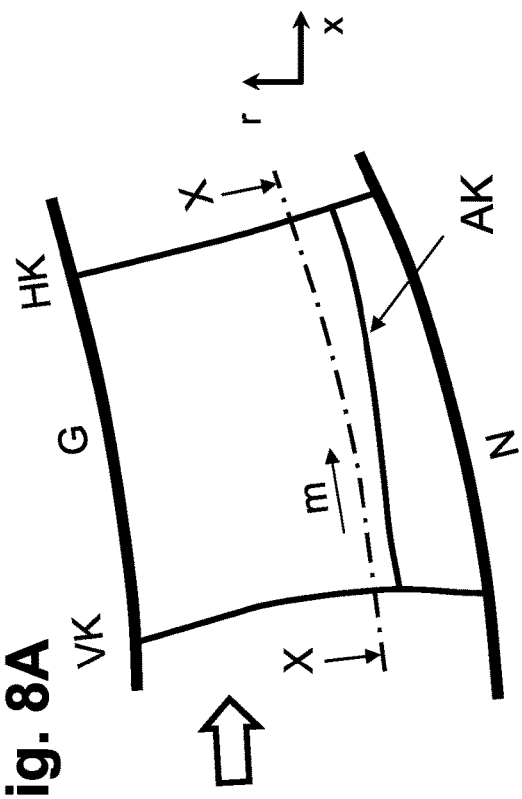
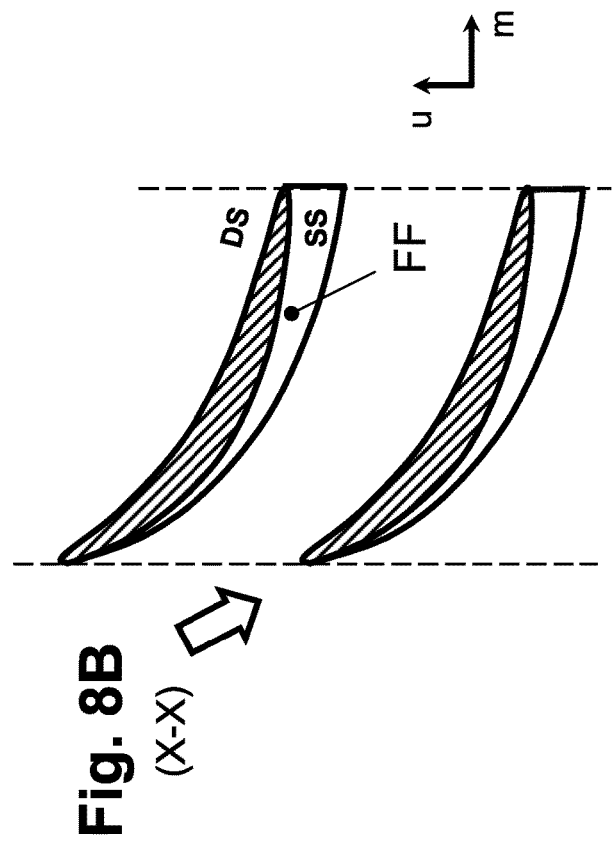

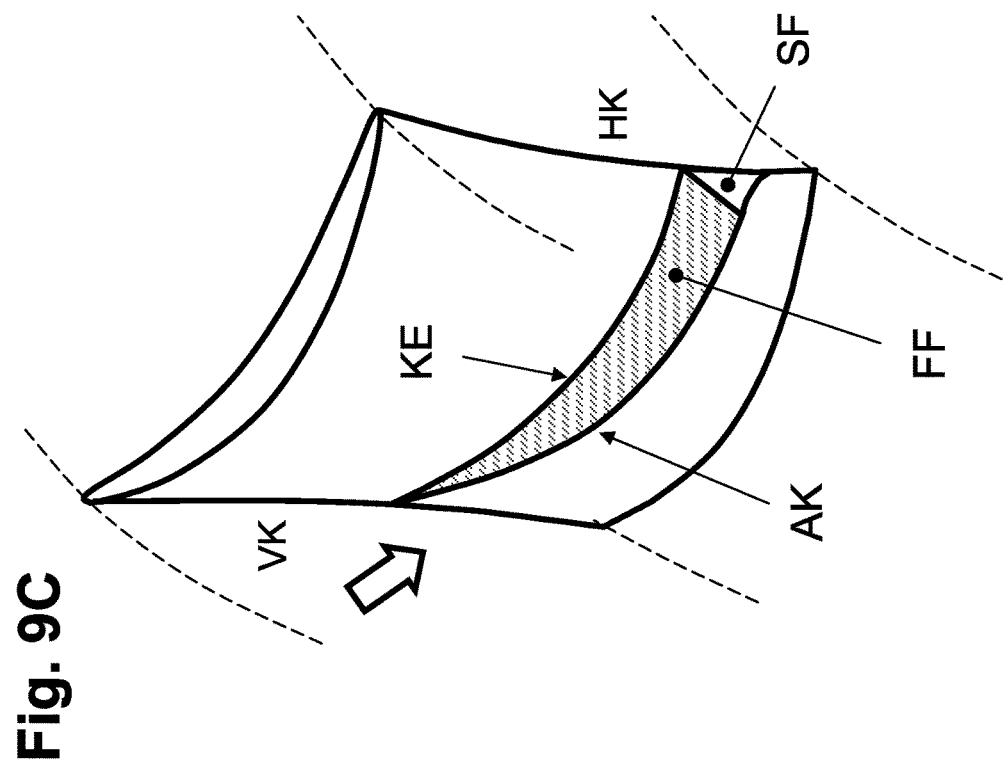
Fig. 9C
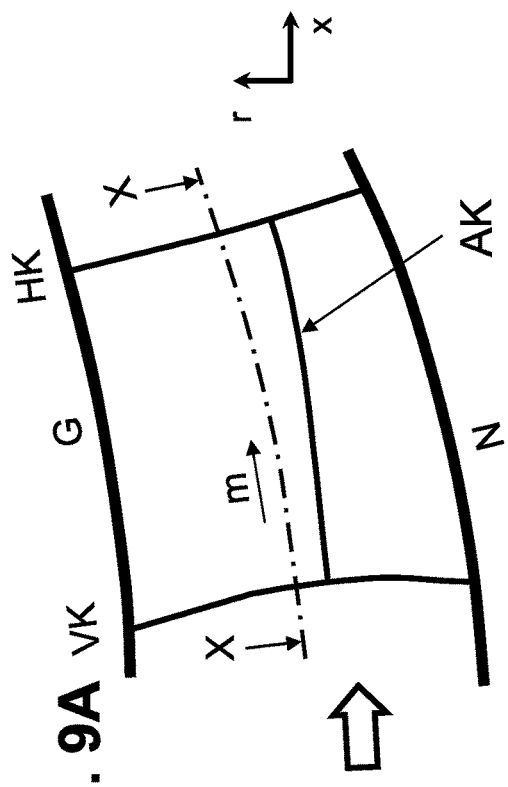
Fig. 9A
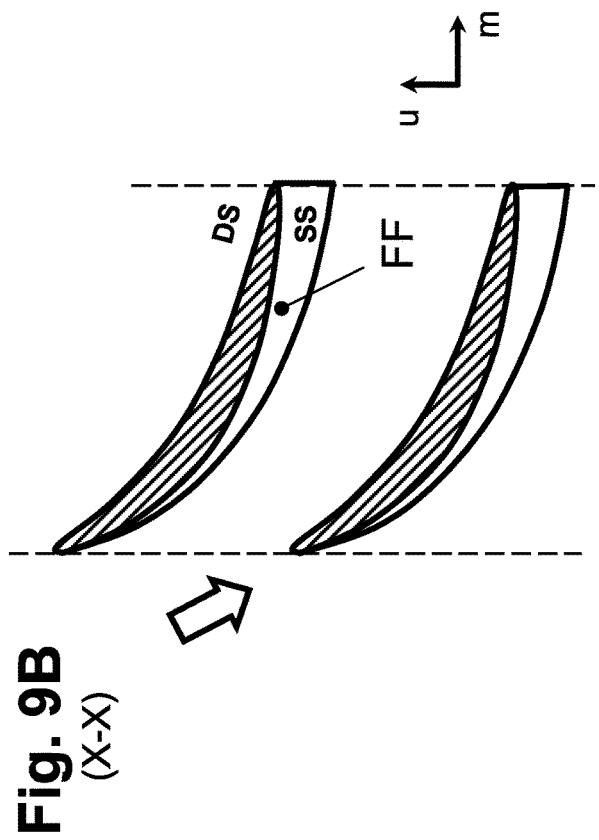
Fig. 9B (X-X)

(Y-Y)

BLADE OF A ROW OF ROTOR BLADES OR STATOR BLADES FOR USE IN A TURBOMACHINE

This application is the National Phase of International Application PCT/EP2012/069214 filed Sep. 28, 2012 which designated the U.S.

This application claims priority to German Patent Application No. DE102011083778.7 filed Sep. 29, 2011, which application is incorporated by reference herein.

BACKGROUND

This invention relates to a blade of a row of rotor blades or stator blades for use in a turbomachine.

The flow in blade rows of aerodynamically highly loaded turbomachines is characterized by a very high flow deflection that has to be achieved. The necessary flow deflection can be, either in parts of the blade height or along the entire blade height, so high that a conventional blade profile section shape, designed according to the state of the art, leads to premature separation of the boundary layer flow on the blade profile and in the side wall area on hub and casing. Conventional blades, as shown in FIGS. 12A, 12B, without additional design features for stabilization of the profile and wall boundary layers, are unsuitable on account of extremely high pressure losses and non-achievement of the required flow deflection. In addition, the secondary flows occurring in the area of the confining side walls (on hub and casing) become uncontrollable and lead to further very high total pressure losses. The consequence of this is overall poor performance characteristics of the turbomachine.

Blades with a design according to the state of the art, see FIGS. 12A, 12B, have, on account of the heavy aerodynamic loading occurring in the boundary layers, i.e. the two-dimensional boundary layers on the profile and the three-dimensional boundary layers on the hub and casing wall, too low a working range and too high losses for delivery of the operating characteristics required in modern turbomachines.

SUMMARY

There is thus a need for blades achieving a stabilization of the profile and wall boundary layers together with a high flow deflection, thereby providing a wider working range and low losses.

In accordance with an exemplary embodiment of the invention a blade having a suction side, a pressure side, a leading edge and a trailing edge is provided for use in a turbomachine, with the blade featuring at least one contour recess on at least one of its sides including the suction side and the pressure side. The contour recess includes a step edge, a contour corner and a flank face provided between the step edge and the contour corner. The step edge, the flank face and the contour corner here extend over at least a part of the profile depth (e.g. over at least 30% of the profile depth) of the blade (i.e. in the direction of the meridional flow lines) from a starting point provided at or downstream of the leading-edge plane to an end point provided downstream of the starting point and upstream of or in the trailing-edge plane. The step edge, the flank face and the contour corner can here likewise extend over at least a part of the profile height of the blade (i.e. perpendicular to the meridional flow lines), so that an oblique course is provided. In a borderline case, at least the step edge can also extend solely in the direction of the profile height, i.e. running perpendicular to the meridional flow lines.

In other words, the solution in accordance with the invention provides a local blade thickness variation linked to an edge formation. The edges can be designed steadily curved or rounded here. The fact that the thickness variation is linked to an edge formation means here that the contour of the blade recedes in a certain area of the pressure or suction side substantially abruptly towards the interior of the blade. In the area of the edges (step edge and contour corner) the curvature of the blade is thus locally increased.

Due to the provision of a contour recess, the flow undergoes an additional rotary movement over the length of the blade, so that an improved flow deflection can be achieved. This can be used to provide either a turbomachine with a reduced number of blades or a turbomachine with a higher flow deflection.

The present invention relates to blades of turbomachines, such as blowers, compressors, pumps, fans and turbines of the axial, semi-axial and radial type using gaseous or liquid working media. The turbomachine may include one or several stages, each having a rotor and a stator, in individual cases, the stage is only formed by a rotor. The rotor blades and stator blades are arranged in a main flow path, which is confined by main flow path boundaries, usually a casing contour on the outside and a hub contour on the inside. The rotor includes a number of blades, which are connected to the rotating shaft of the machine. The rotor may be designed with or without shroud at the outer blade ends. The stator includes a number of stationary blades, which may either feature a fixed or a free blade end on the hub and on the casing side. Rotor drum and blading are usually enclosed by a casing forming the outer main flow path boundary, while in other cases in accordance with the invention, for example in aircraft or ship propellers, no such casing exists and the outer main flow path boundary is formed by the outermost meridional flow line touching the blade tip of the rotor.

An exemplary embodiment of the invention provides the step edge at at least one point of its course oblique relative to the meridional flow around the blade, such that along a meridional flow line passing over the step edge there is a contour receding in the meridional flow direction and in this way the flank face adjacent to the step edge is in the lee of the meridional flow passing along the blade surface. Here the course of the meridional flow lines of the turbomachine in the meridional plane established by the axial coordinate (x) and the radial coordinate (r) is provided by points which result from respectively the same percentage subdivision of several straight lines G(i) designed between the hub contour and the casing contour, positioned perpendicularly to the mean meridional flow line SLM in the middle of the main flow path and forming part of a family.

Further embodiments will become apparent from the present description.

BRIEF DESCRIPTION OF THE DRAWINGS

The present invention is described in the following in light of the accompanying figures showing exemplary embodiments:

FIG. 1 shows the definition of meridional flow lines and meridional flow line profile sections on a blade in accordance with the present invention, FIGS. 3A-3C show a further exemplary embodiment of a blade in accordance with the present invention in meridional view, in the profile section along line X-X of FIG. 3A and in perspective view, FIGS. 5A-5C show a further exemplary embodiment of a blade in accordance with the present invention in meridional view, in the profile section along line X-X of FIG. 5A and in perspective view, FIGS. 7A-7C show a further exemplary embodiment of a blade in accordance with the present invention in meridional view, in the profile section along line X-X of FIG. 7A and in perspective view, FIGS. 8A-8C show a further exemplary embodiment of a blade in accordance with the present invention in meridional view, in the profile section along line X-X of FIG. 8A and in perspective view, FIGS. 9A-9C show a further exemplary embodiment of a blade in accordance with the present invention in meridional view, in the profile section along line X-X of FIG. 9A and in perspective view.

A conventional blade according to the state of the art, as shown in FIG. 12A and FIG. 12B, has no step edge on one of its blade sides. FIG. 12B shows a profile section of the blade represented in FIG. 12A in a meridional section. In the meridional section, the inflow, indicated by the thick arrow, is from left to right. In conventional blades, the flow passes around the individual profile sections of the blades (see flow line profile section P-P) along completely smooth contours without a step.

FIG. 1 shows the main flow path with the flow passing through it from left to right (indicated by the arrow on the left), in the meridional plane established by the axial coordinate x and the radial coordinate r, with the main flow path being confined by the radially inner main flow path boundary N and the radially outer main flow path boundary G.

Figure 2B:
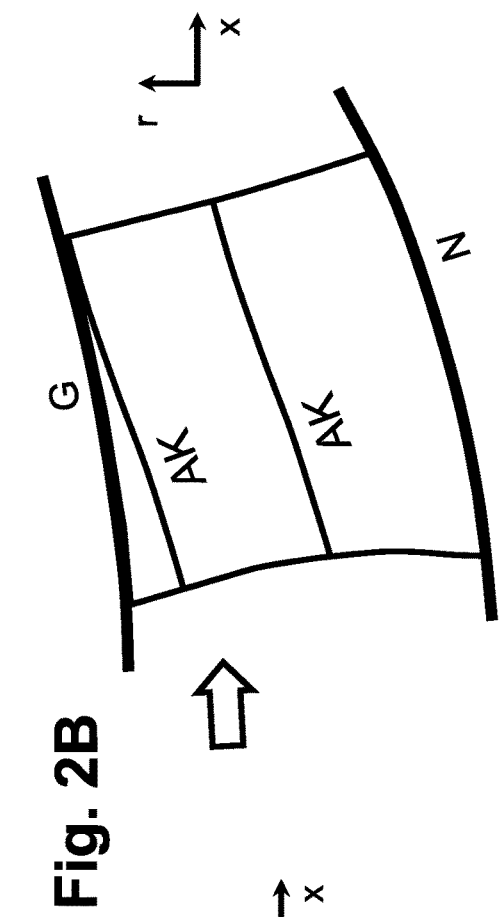
FIGS. 2A-2D show four blades in accordance with the present invention, each in meridional view.

The mean meridional flow line SLM is provided in the middle between the radially inner main flow path boundary N and the radially outer main flow path boundary G. Its course corresponds to the connection of the center points of circles inscribed in the main flow path, as made clear by way of example in the figure for the first marked point P1 on the mean meridional flow line SLM and the associated circle K1.

A family of straight lines G(i) is provided inside the main flow path, whose members are each perpendicular to the mean meridional flow line SLM and end at the main flow path boundaries G and N. Further meridional flow lines SL(i) are defined by the connection of points each with the same percentage subdivision of the straight lines G(i) between the main flow path boundaries N and G. The course of the contour recess and of its step edge AK respectively, can be assessed and specified in relation to the family of the meridional flow lines SL(i).

Also marked in the figure are the leading and trailing edges VK and HK of the blade and the step edge of a contour recess in accordance with the invention. The distance between the blade leading edge VK and the blade trailing edge HK along a meridional flow line, in particular along the mean meridional flow line SLM, represents the profile depth of the blade.

By way of example, the suction side of the blade is viewed here, on which are provided the contour recess and the associated step edge AK drawn with solid line. In accordance with the invention, a contour recess and the associated step edge can however also be provided on the pressure side of the blade, as made clear by the step edge AK drawn with a dashed line.

It is provided in an embodiment that the step edge AK of the contour recess matches a meridional flow line along at least a part of its course along a blade side including the pressure and suction sides.

It is in particular provided in an embodiment that the step edge AK of the contour recess extends, at at least one point of its course along a blade side including the pressure and suction sides, obliquely to a meridional flow line, or even runs obliquely to the meridional flow lines SL(i) intersecting the latter over its entire course. In the latter case, it can be provided that the step edge AK of the contour recess is intersected in each of its points by a meridional flow line (SL(i)) at an inclination angle, said inclination angle being for example less than 45° or less than 30°.

FIGS. 2A-2D show as examples four blades in accordance with the invention in the meridional plane established by the axial coordinate x and the radial coordinate r. All partial illustrations show the view of the usually substantially convex-designed blade suction side, with the pressure side facing away from the observer. The arrow on the left indicates in each case the main flow direction. Each of the four blades has on the suction side a contour recess, identified by the associated step edge AK, which extends along the profile depth of the blade and which in the cases shown here reaches from the blade leading edge VK to the blade trailing edge HK. In accordance with the invention, however, contour recesses or step edges that extend only over a part, for example at least 30% of the profile depth of the blade, are also possible.

The flow around the blade is confined by the inner main flow path boundary N, e.g. a hub, and by the outer main flow path boundary G, e.g. a casing.

Figure 2D:
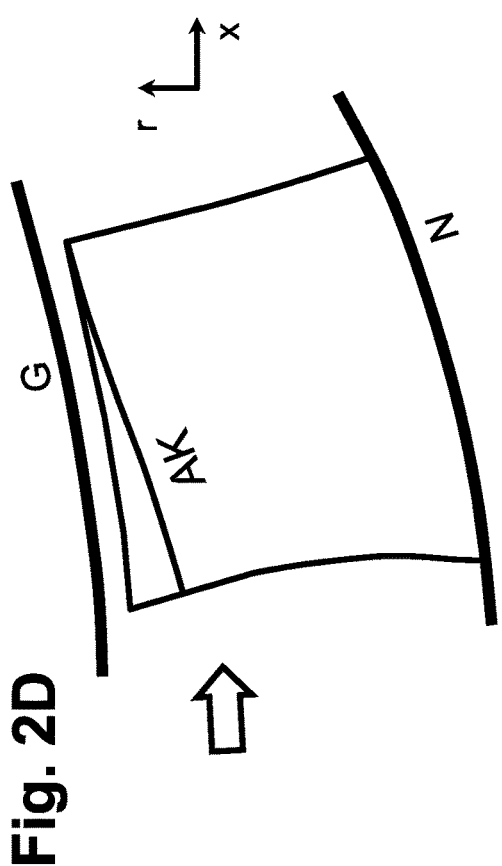
Figure 2A:
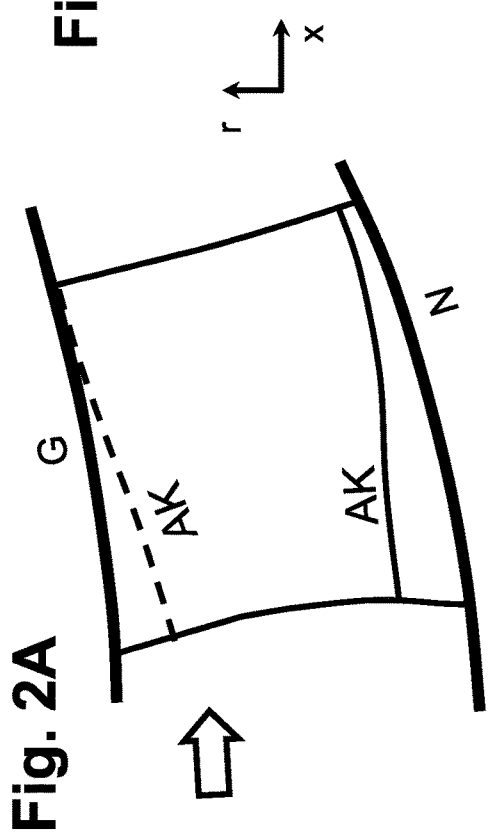

FIG. 2A shows a blade in accordance with the invention having two fixed blade ends. This can be a rotor blade, where a platform with root forms the inner main flow path boundary N (hub) and a shroud forms the outer main flow path boundary G. This can however also be a stator blade, where a shroud forms the inner main flow path boundary N and a platform with root forms the outer main flow path boundary G.

In the area of the inner blade end, a contour recess with a step edge AK extends along the suction side from a starting point located in the leading-edge plane at some distance from the inner main flow path boundary N to an end point located at a certain distance from the inner main flow path boundary N in the trailing-edge plane.

The leading-edge plane is here provided by rotation of the leading-edge line provided in the meridional plane x-r in the circumferential direction u about the center axis of the turbomachine, and the trailing-edge plane by rotation of the trailing-edge line provided in the meridional plane x-r in the circumferential direction u about the center axis of the turbomachine.

In alternative embodiments, step edges can be provided of which the starting or end point is directly at the main flow path boundary.

In the area of the outer blade end, a contour recess with a step edge AK runs along the pressure side (shown dashed, since the pressure side faces away from the observer) from a starting point located in the leading-edge plane at some distance from the outer main flow path boundary G to an end point located at the outer main flow path boundary G in the trailing-edge plane.

FIG. 2B also shows a blade in accordance with the invention having two fixed blade ends. In the area of the outer blade end, a contour recess with a step edge AK runs along the suction side from a starting point located in the leading-edge plane at some distance from the outer main flow path boundary G to an end point located at the outer main flow path boundary G in the trailing-edge plane. A second contour recess with a step edge AK runs in a similar way in the middle area of the blade suction side. Additionally or alternatively, several contour recesses with a step edge can be formed on the pressure side of the blade.

Figure 2C:
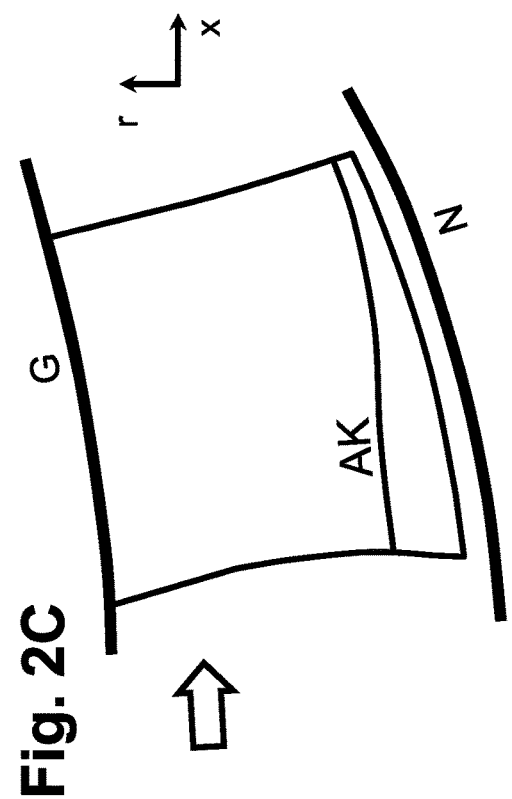

FIG. 2C shows a blade in accordance with the invention having a fixed blade end at the outer main flow path boundary G (casing) and a free inner blade end. This can be a rotor blade, where a platform with root forms the outer and rotating main flow path boundary G (casing) and a running gap is provided at the inner and stationary main flow path boundary N (hub). This can however also be a stator blade, where a platform with root forms the outer and stationary main flow path boundary G (casing) and a gap is provided at the inner and rotating main flow path boundary N (hub).

In the area of the inner free blade end, a contour recess with a step edge AK runs along the suction side from a starting point located in the leading-edge plane at some distance from the inner blade end to an end point located at a certain distance from the inner blade end in the trailing-edge plane. Contour recesses or step edges respectively, whose starting or end point is directly at the inner blade end, can also be provided.

FIG. 2D shows a blade in accordance with the invention having a fixed blade end at the inner main flow path boundary N (hub) and with a free outer blade end. This can be a rotor blade, where a platform with root forms the inner and rotating main flow path boundary N (hub) and a running gap is provided at the outer and stationary main flow path boundary G (casing). This can however also be a stator blade, where a platform with root forms the inner and stationary main flow path boundary G (casing) and a gap is provided at the outer main flow path boundary G (casing).

In the area of the outer free blade end, a contour recess with a step edge AK runs along the suction side from a starting point located in the leading-edge plane at some distance from the outer blade end to an end point located at a certain distance from the outer blade end in the trailing-edge plane. Contour recesses with a step edge, whose starting or end point is directly at the outer blade end, can also be provided in accordance with the present invention.

FIG. 2D includes in the case of a rotor blade a running gap and a casing enclosing the blade row. In alternative embodiments, however, a non-enveloped configuration without casing can also be provided.

The step edge AK of a contour recess runs in one exemplary embodiment at at least one of its points obliquely to a defined extent to the meridional flow around the blade. This imparts an additional rotary mouvement to the flow.

It can be provided that the step edge AK in the meridional view is shaped in a straight line or continuously curved in one direction. It can also be provided that the step edge AK in the meridional view shows an S-shape or has more than one curvature change.

FIGS. 3A-3C show a further exemplary embodiment of a blade in accordance with the present invention having a contour recess in three different views.

FIG. 3A shows the blade in the meridional plane established by the axial coordinate x and the radial coordinate r. The arrow on the left indicates the main flow direction. The blade is arranged between the inner and outer main flow path boundaries N, G and has a leading edge VK onto which the flow passes and a trailing edge HK away from which the flow passes.

The step edge AK of the contour recess extends in this exemplary embodiment over the entire profile depth of the blade and runs accordingly from a starting point on the leading edge to an end point on the trailing edge. The step edge AK is provided in the area of the inner main flow path boundary N, in such a way that it approaches in the main flow direction the inner main flow path boundary.

It can be provided that the step edge AK, as shown here, ends directly at the main flow path boundary N.

The meridional flow direction is characterized by a small arrow and the assigned letter m. Along a meridional flow line, the section X-X through the blade looking onto the inner main flow path boundary, the step edge AK and the flank face FF of the contour recess are marked.

FIG. 3B shows the blade in accordance with the invention in the section X-X, i.e. in the plane established by the circumferential coordinate u and the meridional coordinate m. The arrow on the left indicates the main flow direction. For greater clarity, two adjacent blades of the entire blade row are shown, where the profile contour is formed in each case by the substantially convex suction side SS and the substantially concave pressure side DS. The profile illustrated here shows as an example a shape typical for compressors or fans, however a profile shape typical for turbines with more curvature, with a different relative thickness and with different leading and trailing-edge direction angles is likewise in accordance with the invention. In the view X-X, both the step edge AK and the adjacent flank face FF of the contour recess can be discerned. In the solution shown here in accordance with the invention, the width of the flank face increases continuously in the flow direction along the blade profile depth and ends with a maximum value in the trailing-edge plane.

FIG. 3C shows the blade in a perspective view looking from downstream onto the suction side of the blade and the contour recess with step edge AK and flank face FF. The arrow on the left indicates the main flow direction, running approximately from top left to bottom right in FIG. 3C. An elongated arrow indicates the possible course of the meridional flow on the blade contour and, in the solution shown here in accordance with the invention, on the suction side. It can be seen from this that the course of the contour recess and of the step edge AK is such that the flank face FF is in the lee relative to the incoming meridional flow, corresponding to a blade contour receding downstream of the step edge AK. The flank face FF is in the lee at at least one point relative to the meridional flow. It can be provided here that the flank face FF is in the lee at every point of the contour recess relative to the meridional flow.

Figure 4C:
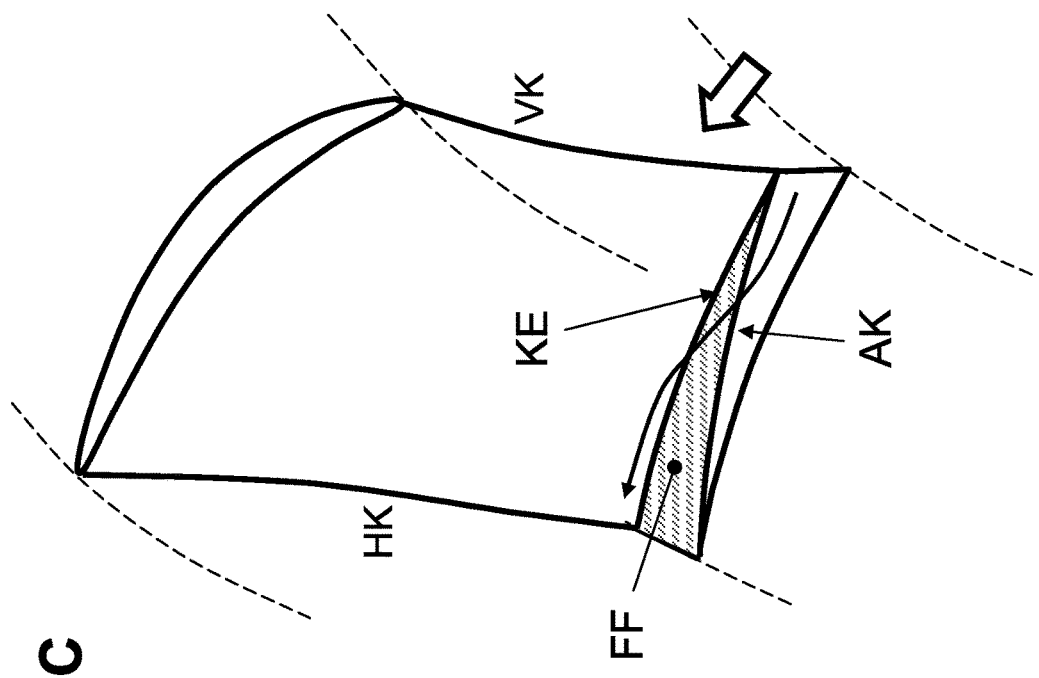
FIGS. 4A-4C show a further exemplary embodiment of a blade in accordance with the present invention in meridional view, in the profile section along line X-X of FIG. 4B and in perspective view.
Figure 4A:
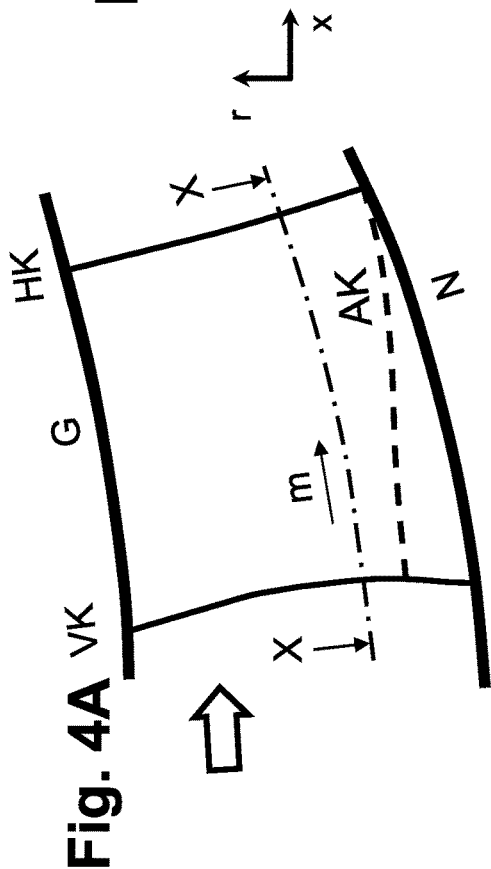
Figure 4B:
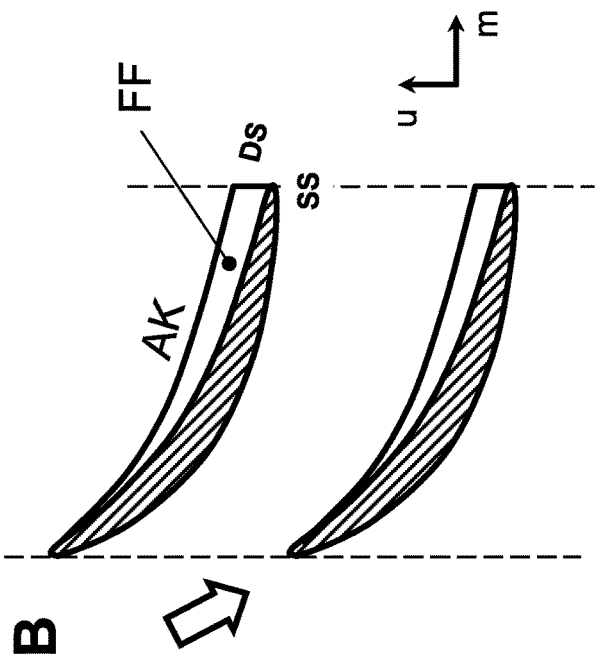

FIGS. 4A-4C show a further exemplary embodiment of a blade in accordance with the present invention having a step edge in three different views, similar to the representation in FIGS. 3A-3C. Here, only the contour recess with the associated step edge AK and the flank face FF is provided on the pressure side of the blade. This is indicated in FIG. 4A by a dashed course of the step edge AK. In FIG. 4B, the arrow on the right indicates the main flow direction, which in this part of the figure approximately runs from bottom right to top left. An elongated arrow indicates the possible course of the meridional flow on the blade contour and in the solution shown here on the pressure side.

FIGS. 5A-5C show a further exemplary embodiment of a blade in accordance with the present invention having a contour recess in three different views, similar to the representation in FIGS. 3A-3C. The contour recess with the associated step edge AK and the flank face FF is here provided on the suction side of the blade, but does not begin at the leading edge, instead downstream of the leading edge by a certain amount of the profile depth. The step edge AK of the contour recess ends here too at the inner main flow path boundary, and not at the trailing-edge plane, instead upstream of the trailing-edge plane by a certain amount of the profile depth.

Figure 6C:
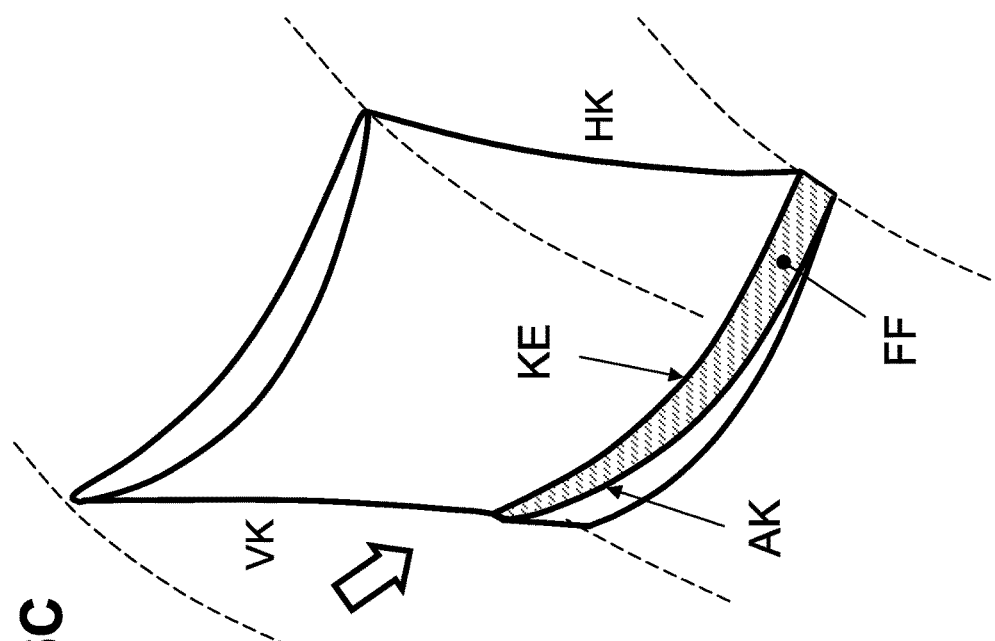
FIGS. 6A-6C show a further exemplary embodiment of a blade in accordance with the present invention in meridional view, in the profile section along line X-X of FIG. 6A and in perspective view.
Figure 6A:
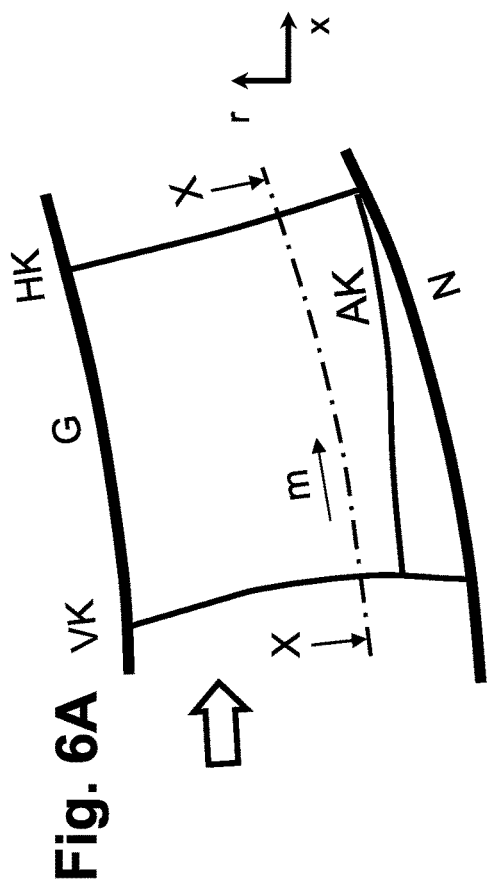
Figure 6B:
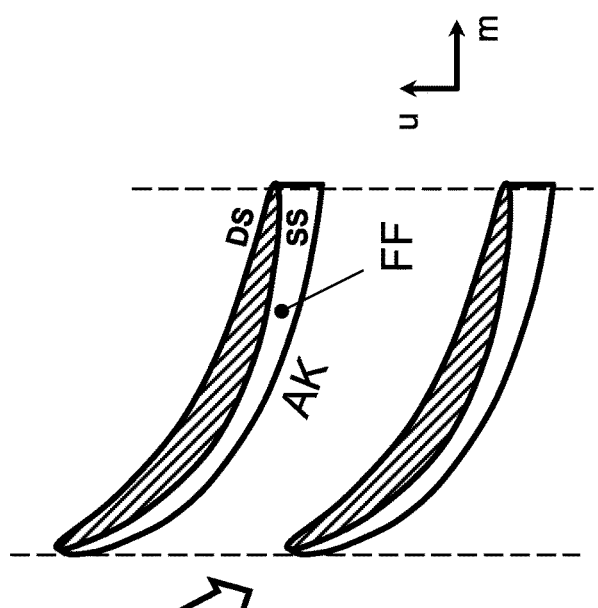

FIGS. 6A-6C show a further exemplary embodiment of a blade in accordance with the present invention having a contour recess in three different views, similar to the representation in FIGS. 3A-3C. The contour recess with the associated step edge AK and the flank face FF is here provided on the suction side of the blade, but not with a flank face width increasing from zero, instead with a width of the flank face FF starting directly at the starting point with a finite amount.

FIGS. 7A-7C show a further exemplary embodiment of a blade in accordance with the present invention having a contour recess in three different views, similar to the representation in FIGS. 3A-3C. The contour recess with the associated step edge AK and the flank face FF is here provided on the suction side of the blade, but not with a flank face width increasing continuously in the flow direction, instead with a flank face width varying in the flow direction. The exemplary embodiment shown thus provides a flank face width initially growing and then decreasing to zero. The end point of the step edge is here at a certain distance from the inner main flow path boundary and at a certain distance upstream of the trailing edge.

FIGS. 8A-8C show a further exemplary embodiment of a blade in accordance with the present invention having a contour recess in three different views, similar to the representation in FIGS. 3A-3C. The contour recess with the associated step edge AK and the flank face FF is here provided on the suction side of the blade, however ends here not directly at the inner main flow path boundary N, but at a certain distance from it. Also, for profile definition in the area of the blade between the step edge AK and the inner main flow path boundary N, a shape similar or identical to the flank face is projected onto the inner main flow path boundary N, with the result that the contour recess ends with a substantially rectangular end face SF located in the lee of the flow.

FIGS. 9A-9C show a further exemplary embodiment of a blade in accordance with the present invention having a contour recess in three different views, similar to the representation in FIGS. 8A-8C. The contour recess with the associated step edge AK and the flank face FF is here provided on the suction side of the blade, here again ending at a certain distance from the inner main flow path boundary N, however the profile definition between the inner main flow path boundary N and the contour recess merges into a conventional shape with thin trailing edge when approaching the inner main flow path boundary, with a substantially triangular end face SF located in the lee of the flow being obtained.

Figure 10A:
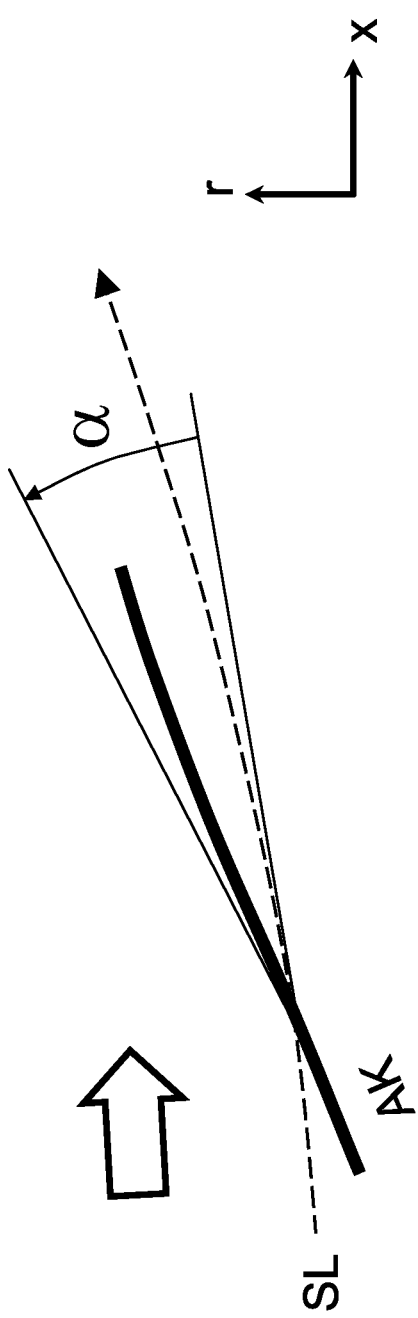
FIG. 10A shows a representation of an edge inclination angle between a meridional flow line and a step edge.

FIG. 10A shows a selected meridional flow line SL and the step edge AK of a contour recess in accordance with the invention in the meridional plane established by the axial coordinate x and the radial coordinate r. The step edge AK is intersected at one of its points by the meridional flow line SL at an inclination angle $\alpha$. The inclination angle $\alpha$ is measured over the shortest angular distance from the meridional flow line SL towards the tangent at the step edge AK in the intersection point with the meridional flow line SL.

In an embodiment, it is provided that at at least one point of the course of the step edge AK an inclination angle $\alpha$ with a value lower than 30 degrees is achieved. It may be provided in particular that at at least one point of the course of the step edge AK an inclination angle $\alpha$ with a value lower than 15 degrees is achieved. It may also be provided that not only at at least one point but over the entire course of the step edge AK an inclination angle $\alpha$ with a value lower than 15 degrees is achieved.

Figure 10B:
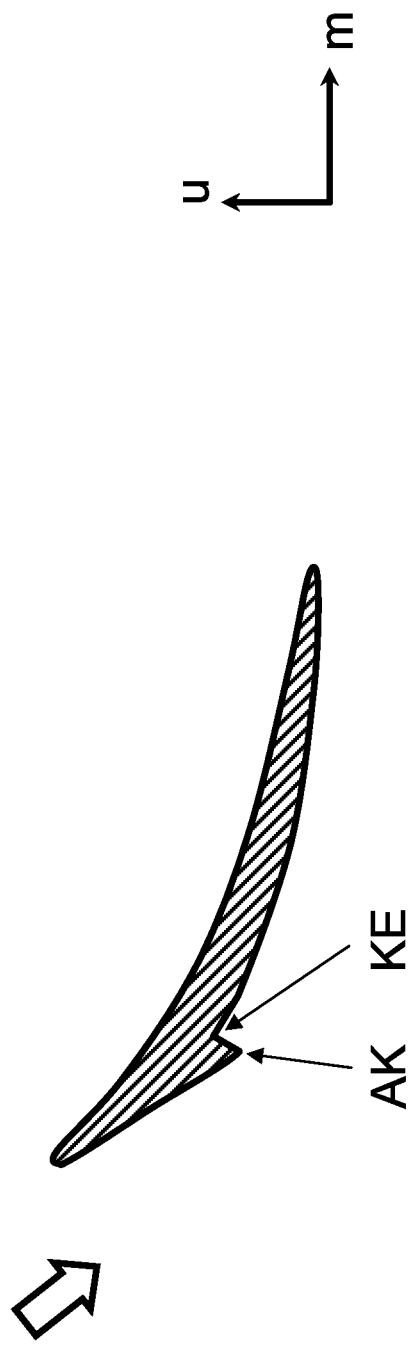
FIG. 10B shows a meridional flow line profile section of an exemplary embodiment of a blade.

FIG. 10B shows a particular embodiment of the invention in a meridional flow line profile section of a blade, hence in the plane established by the meridional coordinate m and the circumferential coordinate u. The contour recess with its step edge AK and its contour corner KE forms here a contour course receding in the flow direction in the meridional flow line profile section, hence such that a blade contour receding in the meridional flow direction is achieved along a meridional flow line intersecting the step edge AK, and in this way the flank face FF adjoining the step edge AK is there in the lee of the meridional flow passing along the blade surface.

Figure 11A:
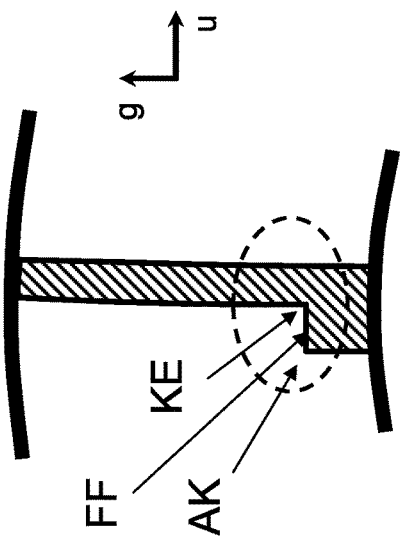
FIG. 11A shows a further exemplary embodiment of a blade in accordance with the present invention in meridional view.
Figure 11B:
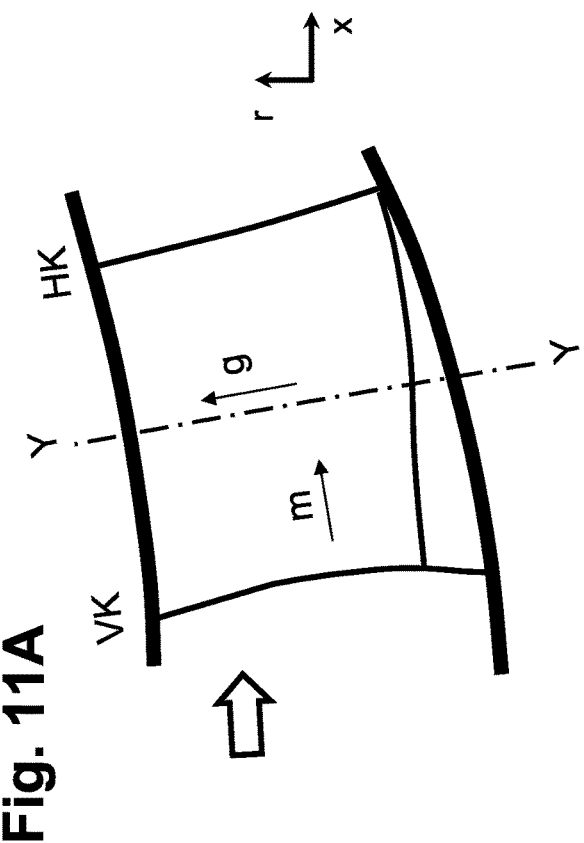
FIG. 11B shows the blade of FIG. 11A in the section along line Y-Y.
Figure 11C:
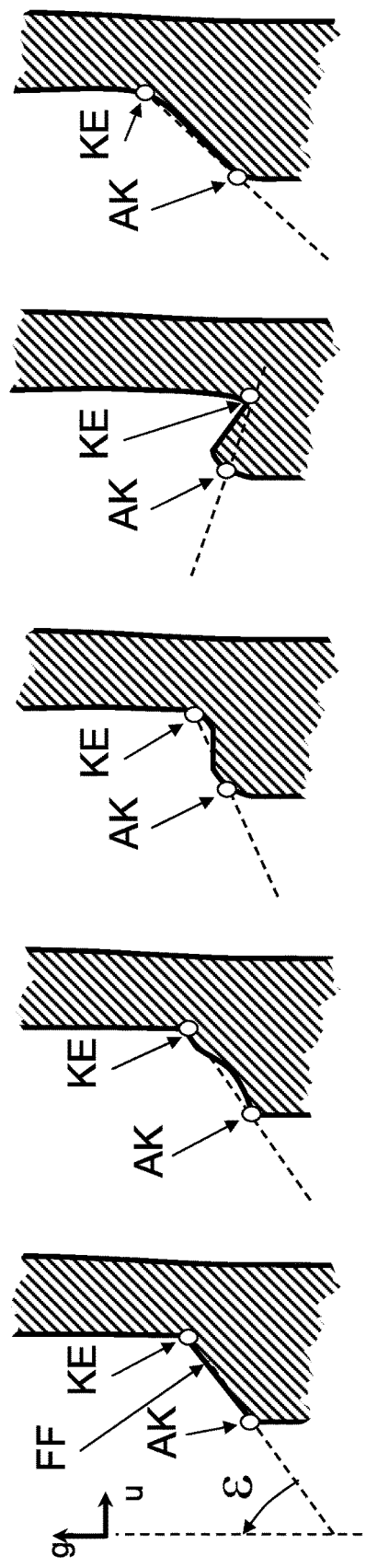
FIG. 11C shows a detail of the section Y-Y of FIG. 11B, representing a plurality of variants of a contour recess.
Figure 12B:
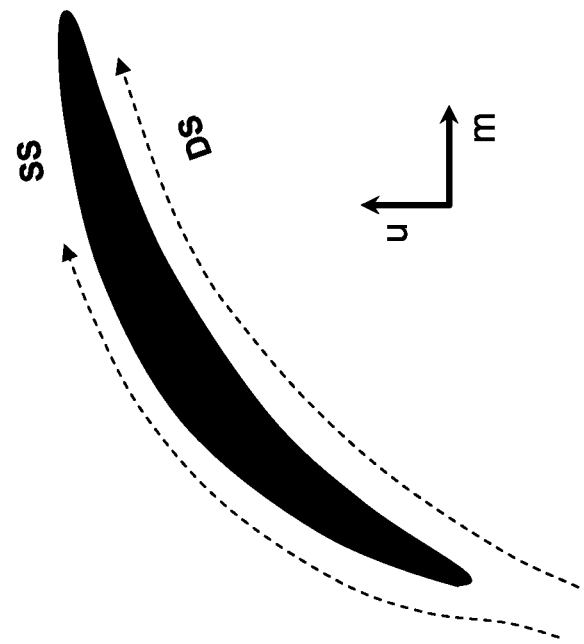
FIG. 12B shows the blade of FIG. 12A in the profile section along line P-P.
Figure 12A:
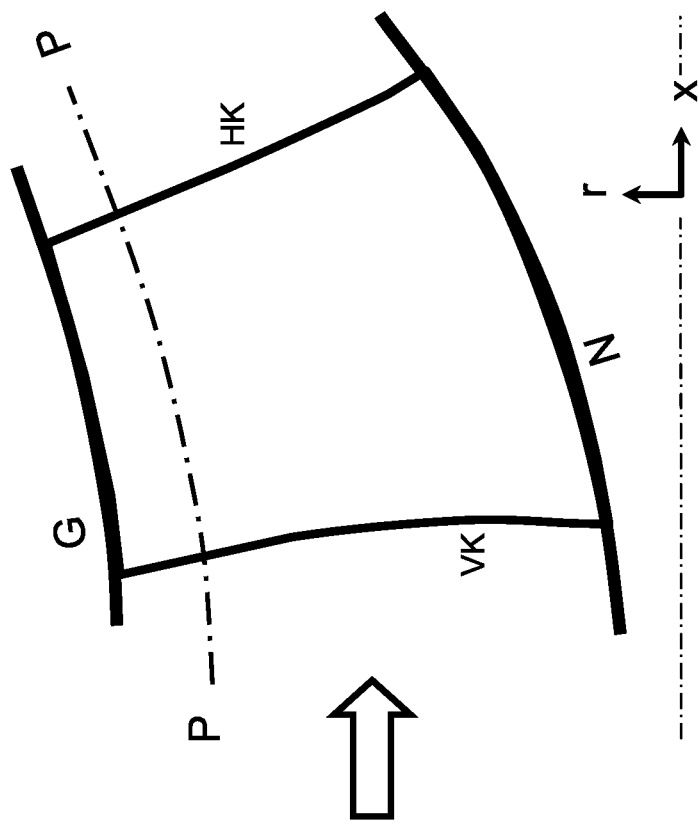
FIG. 12A shows a schematic representation of a blade in accordance with the state of the art in meridional section.

FIGS. 11A-11C show a blade in accordance with the present invention having a contour recess in two different views.

FIG. 11A shows the blade in the meridional plane established by the axial coordinate x and the radial coordinate r. The coordinate directions m (meridional coordinate facing along a meridional flow line) and g (meridian-orthogonal coordinate facing along one of the straight lines G(i) perpendicular to the mean meridional flow line) are each indicated by a short and thin arrow. In the direction of the meridian-orthogonal coordinate, the section Y-Y is marked through the blade in accordance with the invention with a contour recess.

FIG. 11B shows the blade in section Y-Y, i.e. in the plane established by the circumferential coordinate u and the meridian-orthogonal coordinate g. In a section of this type, the contour recess is clearly discernible. It is shown here rectangular in a simple design variant, however non-rectangular contour recesses are also in accordance with the invention.

The contour recess is characterized in that the contour of the blade recedes in a certain area of the pressure or suction side substantially abruptly towards the interior of the blade, providing in the certain area the step edge AK. The course of the step edge AK is provided here by those contour points having the greatest convex curvature in the vicinity of the contour recess. In an extreme case, the step edge AK in accordance with the invention is, as shown in simplified form in the preceding figures, provided by an angular edge.

It can be provided that a contour corner is created by the contour recess, where the course of the contour corner KE is provided by those contour points having the greatest concave curvature in the vicinity of the contour recess. In an extreme case, the contour corner KE is, as shown in simplified form in the preceding figures, provided by an angular edge.

FIG. 11C shows a detail from the view of the section Y-Y, which in FIG. 11B is circled with a dashed ellipse, i.e. the region of the contour recess. Five variants in accordance with the invention of the contour recess are shown in a sectional plane established by the meridian-orthogonal coordinate g and the circumferential coordinate u. According to the above definition, the step edge AK and the contour corner KE are provided by points having the greatest convex or concave curvature. The angle $\epsilon$, which in this view is formed between the meridian-orthogonal direction g and a straight line through the points of the step edge AK and the contour corner KE, describes the steepness of the contour recess.

The steepness angle $\epsilon$ is measured from said straight line through AK and KE on the shortest angular distance to the direction g. In embodiments of the invention, values for $\epsilon$ of greater than 10 degrees are achieved at at least one point of the course of the contour recess (i.e. when following the contour recess perpendicular to the airfoil plane in the illustration in FIG. 11C).

It is provided in an embodiment that the contour distance of the contour recess between AK and KE in at least one sectional plane established by the meridian-orthogonal coordinate g and the circumferential coordinate u is without tangent discontinuities, and accordingly is shaped straight-lined, curved or wavy.

In an embodiment it is provided that the contour recess in at least one sectional plane established by the meridian-orthogonal coordinate g and the circumferential coordinate u entirely extends without tangent discontinuities, and accordingly is designed rounded in the vicinity of the step edge AK and the contour corner KE.

The invention is not restricted in its design to the exemplary embodiments set forth above, which must be understood only as examples. For instance, the length, position and course of the contour recess can differ from the exemplary embodiments shown. It can also be provided that one or more contour recesses are formed both on the suction side and on the pressure side of a blade.

What is claimed is:

1. A blade of a row of rotor blades or stator blades for use in a turbomachine, comprising:
a convex suction side,
a concave pressure side'
a leading edge, onto which a flow passes, and
a trailing edge, the flow passing away from the trailing edge,
at least one contour recess provided on at least one chosen from the suction side and the pressure side, wherein the contour recess includes,
a step edge,
a contour corner, and
a flank face provided between the step edge and the contour corner,
wherein the contour recess extends over at least a part of a profile depth and a profile height of the blade and
wherein the step edge extends, at least one point of its course of the step edge, obliquely to a meridional flow including a plurality of meridional flow lines around the blade, such that along one of the meridional flow lines passing over the step edge there is a contour receding in a meridional flow direction,
wherein the step edge has a starting point and a downstream end point spaced apart by a finite meridional distance,
wherein the step edge always crosses meridional flow lines at either a negative slope or positive slope, such that the step edge continuously gets closer to only one of a radially inner main flow path boundary and a radially outer main flow path boundary when proceeding in a downstream direction.

2. The blade in accordance with claim 1, wherein the course of the step edge is provided by contour points of the blade having a greatest convex curvature of the blade contour in a vicinity of the contour recess, and a course of the contour corner is provided by contour points of the blade having a greatest concave curvature of the blade contour in the vicinity of the contour recess.

3. The blade in accordance with claim 1, wherein the blade, in a meridional plane established by an axial coordinate x and a radial coordinate r is overflown by a family of meridional flow lines M(i), wherein
in a middle of a main flow path between the radially inner main flow path boundary and the radially outer main flow path boundary, a mean meridional flow line is provided, a course of which is defined by a connection of center points of circles inscribed in the main flow path,
inside the main flow path, a family of straight lines is alternatively provided, whose members are each positioned perpendicularly to the mean meridional flow line and end at the main flow path boundaries,
besides the mean meridional flow line, further meridional flow lines are defined by a connection of points an equal the same percentage subdivision of the straight lines between the main flow path boundaries,
the direction of one of the meridional flow lines defining the meridional coordinate, variable from point to point,
wherein the contour of the blade in at least one sectional plane through the blade established by a meridian-orthogonal coordinate and a circumferential coordinate has a step in a locally confined narrow area, and
the meridian-orthogonal coordinate is also variable from point to point and is defined as always being positioned perpendicularly to the mean meridional flow line.

4. The blade in accordance with claim 3, wherein, when viewing the contour recess in a sectional plane established by a meridian-orthogonal coordinate and a circumferential coordinate, an auxiliary straight line defined by a point of the step edge, having a locally maximum convex contour curvature, and a point of the contour corner, having a locally maximum concave contour curvature, is inclined against a meridian-orthogonal direction by a steepness angle, with the steepness angle being measured from the auxiliary straight line on a shortest angular distance to the meridian-orthogonal direction, and wherein the steepness angle exceeds 10 degrees at at least one point of a course of the contour recess.

5. The blade in accordance with claim 1, wherein the at least one contour recess includes a contour recess provided on the suction side of the blade.

6. The blade in accordance with claim 1, wherein the step edge of the contour recess matches one of the meridional flow lines along at least a part of its course.

7. The blade in accordance with claim 1, wherein the step edge of the contour recess starts in or downstream of a leading-edge plane of the blade, with the leading-edge plane being provided by rotation of the leading-edge line provided in a meridional plane in a circumferential direction about a center axis of the turbomachine.

8. The blade in accordance with claim 1, wherein the step edge of the contour recess ends in or upstream of a trailing-edge plane of the blade, with the trailing-edge plane being provided by rotation of a trailing-edge line provided in a meridional plane in a circumferential direction about the center axis of the turbomachine.

9. The blade in accordance with claim 1, wherein the contour recess is provided in a rim area of the blade, defined by radially inner or a radially outer 30% of a main flow path width in a vicinity of at least one of the radially inner and the radially outer main flow path boundaries.

10. The blade in accordance with claim 1, wherein the step edge of the contour recess, ends directly at only one of the radially inner main flow path boundary, the radially outer main flow path boundary, and at an edge profile section of the blade, respectively.

11. The blade in accordance with claim 1, wherein the flank face of the contour recess includes finite width ends directly at only one of the radially inner main flow path boundary, the radially outer main flow path boundary, and at an edge profile section of the blade, respectively.

12. The blade in accordance with claim 1, wherein the contour recess is provided in a rim area, defined by a radially inner or a radially outer 30% of a main flow path width in a vicinity of a fixed blade end, at an inner end of a rotor blade, at an outer end of a rotor blade provided with an outer shroud, at an inner end of a stator blade provided with an inner shroud or at an outer end of a stator blade.

13. The blade in accordance with claim 1, wherein the contour recess is provided in a rim area, defined by a radially inner or a radially outer 30% of a main flow path width in a vicinity of a free blade end, at an outer end of a rotor blade or at an inner end of a stator blade, with a gap being provided between an edge profile section of the free blade end and at least one of the radially inner main flow path boundary, and the radially outer main flow path boundary.

14. The blade in accordance with claim 1, wherein the step edge of the contour recess in the meridional view is provided in a straight line or monotonously curved or has at least one curvature change.

15. The blade in accordance with claim 1, wherein the contour recess is provided with the step edge, flank face and contour corner along an entire profile depth of the blade.

16. The blade in accordance with claim 1, wherein a width of the flank face increases continuously in the meridional flow direction along a blade profile depth and correspondingly ends with a maximum of the width.

17. The blade in accordance with claim 1, wherein the contour recess forms a ramp which in the meridional flow direction from a blade contour point within the main flow path leads to one of the radially inner main flow path boundary and a radially outer main flow path boundary.

18. The blade in accordance with claim 1, wherein the step edge of the contour recess in a meridional plane established by an axial coordinate and a radial coordinate is intersected at an intersection point by one of the meridional flow lines at an inclination angle, with the inclination angle always being measured over a shortest angular distance from a tangent towards the one of the meridional flow lines to the tangent towards the step edge, and with the inclination angle being provided at at least one point of the course of the step edge with a value lower than 30 degrees.

19. The blade in accordance with claim 1, wherein the contour recess is provided on a blade, which is part of a double-row or slotted stator or rotor blade arrangement.

20. The blade in accordance with claim 1, wherein the step edge of the contour recess is configured to be at least one chosen from starting at a leading-edge plane of the blade and ending at a trailing-edge plane of the blade.

21. The blade in accordance with claim 1, wherein the contour recess extends over at least 30% of a profile depth from a starting point provided at or downstream of a leading-edge plane to an end point provided downstream of the starting point and upstream of or in a trailing-edge plane.

22. The blade in accordance with claim 1, wherein the contour recess extends over at least a part of a profile depth, with the step edge of the contour recess over its entire course configured to be at least one chosen from running obliquely to the meridional flow lines and matching one of the meridional flow lines along at least a part of its course.

23. The blade in accordance with claim 1, wherein the contour recess extends over at least a part of a profile depth, with the step edge of the contour recess configured to be at least on chosen from intersected in each of its points by one of the meridional flow lines at an inclination angle of less than 30 degrees in each case, and matching one of the meridional flow lines along at least a part of its course.

24. The blade in accordance with claim 1, wherein the contour recess extends over at least a part of a profile depth, with the step edge of the contour recess at at least one point of its course having an inclination angle of less than 45 degrees to one of the meridional flow lines intersecting the step edge.

25. A turbomachine having a main flow path confined by the radially inner main flow path boundary and the radially outer main flow path boundary, with blades in accordance with claim 1 being arranged in the main flow path.

26. The blade in accordance with claim 1, wherein a width of the flank face along the blade profile depth first increases up to a maximum value and then decreases again.

27. A blade of a row of rotor blades or stator blades for use in a turbomachine, comprising:
    a convex suction side,
    a concave pressure side,
    a leading edge, onto which a flow passes,
    a trailing edge, the flow passing away from the trailing edge,
    at least one contour recess provided on at least one chosen from the suction side and the pressure side, wherein the contour recess includes,
    a step edge, a contour corner, and
    a flank face provided between the step edge and the contour corner, wherein the contour recess extends over at least a part of a profile depth and a profile height of the blade, and
    wherein the step edge extends, at, at least one point of a course of the step edge, obliquely to a meridional flow around the blade, such that along a meridional flow line passing over the step edge there is a contour receding in a meridional flow direction, wherein a width of the flank face increases continuously in the meridional flow direction along a blade profile depth and correspondingly ends with a maximum of the width.

28. A blade of a row of rotor blades or stator blades for use in a turbomachine, comprising:
    a convex suction side,
    a concave pressure side,
    a leading edge, onto which a flow passes, a trailing edge, the flow passing away from the trailing edge,
at least one contour recess provided on at least one chosen from the suction side and the pressure side, wherein the contour recess includes,
a step edge,
a contour corner, and
a flank face provided between the step edge and the contour corner,
wherein the contour recess extends over at least a part of a profile depth and a profile height of the blade, and
wherein the step edge extends, at at least one point of a course of the step edge, obliquely to a meridional flow around the blade, such that along a meridional flow line passing over the step edge there is a contour receding in a meridional flow direction,
wherein a width of the flank face along the blade profile depth first increases up to a maximum of the width and then decreases again.

* * * * *